(12) United States Patent
Auer et al.

(10) Patent No.: US 11,035,924 B2
(45) Date of Patent: Jun. 15, 2021

(54) METHOD FOR LOCATING ANIMALS USING RADIO WAVES

(71) Applicant: SMARTBOW GMBH, Weibern (AT)

(72) Inventors: Wolfgang Auer, Weibern (AT); Branislav Rudic, Linz (AT); Markus Pichler, Kematen (AT)

(73) Assignee: SMARTBOW GMBH, Weibern (AT)

( * ) Notice: Subject to any disclaimer, the term of this patent is extended or adjusted under 35 U.S.C. 154(b) by 290 days.

(21) Appl. No.: 15/580,305

(22) PCT Filed: Jun. 9, 2016

(86) PCT No.: PCT/AT2016/000064
§ 371 (c)(1),
(2) Date: Dec. 7, 2017

(87) PCT Pub. No.: WO2016/197160
PCT Pub. Date: Dec. 15, 2016

(65) Prior Publication Data
US 2018/0160650 A1 Jun. 14, 2018

(30) Foreign Application Priority Data
Jun. 12, 2015 (AT) .................. A 374/2015

(51) Int. Cl.
*G01S 1/00* (2006.01)
*G01S 1/68* (2006.01)
(Continued)

(52) U.S. Cl.
CPC .............. *G01S 1/68* (2013.01); *A01K 11/006* (2013.01); *A01K 29/005* (2013.01);
(Continued)

(58) Field of Classification Search
CPC .......... G01S 1/68; G01S 1/045; G01S 5/0278; G01S 5/02; G01S 2201/01; A01K 11/006; A01K 29/005; G08B 21/0272
(Continued)

(56) References Cited

U.S. PATENT DOCUMENTS 3,999,611 A 12/1976 Bucalo
6,113,539 A 9/2000 Ridenour
(Continued)

FOREIGN PATENT DOCUMENTS

AT 506628 10/2009
DE 10045469 12/2002
(Continued)

OTHER PUBLICATIONS

International Search Report for PCT/AT2016/000064, English Translation attached to original. Both completed by the European Patent Office on Oct. 17, 2016, 5 Pages.
(Continued)

*Primary Examiner* — Chuong P Nguyen
(74) *Attorney, Agent, or Firm* — Scott C. Mayhew

(57) ABSTRACT

A method for locating an animal using radio waves. In radiolocation, a large number of possible calculation results for the location of the animal arise. Using the results of previous measurements and calculations with regard to the possible locations of the node to be located, stochastic calculations are used to filter out, from the plurality of the current location calculation results, that result which in fact applies with the highest probability. Acceleration values which are measured at the animal are used in the stochastic calculations. It is assumed that with increasing measured acceleration values the probability increases that there can also be relatively large distances between temporally successive locations of the node to be located.

8 Claims, 3 Drawing Sheets

Figure 1:
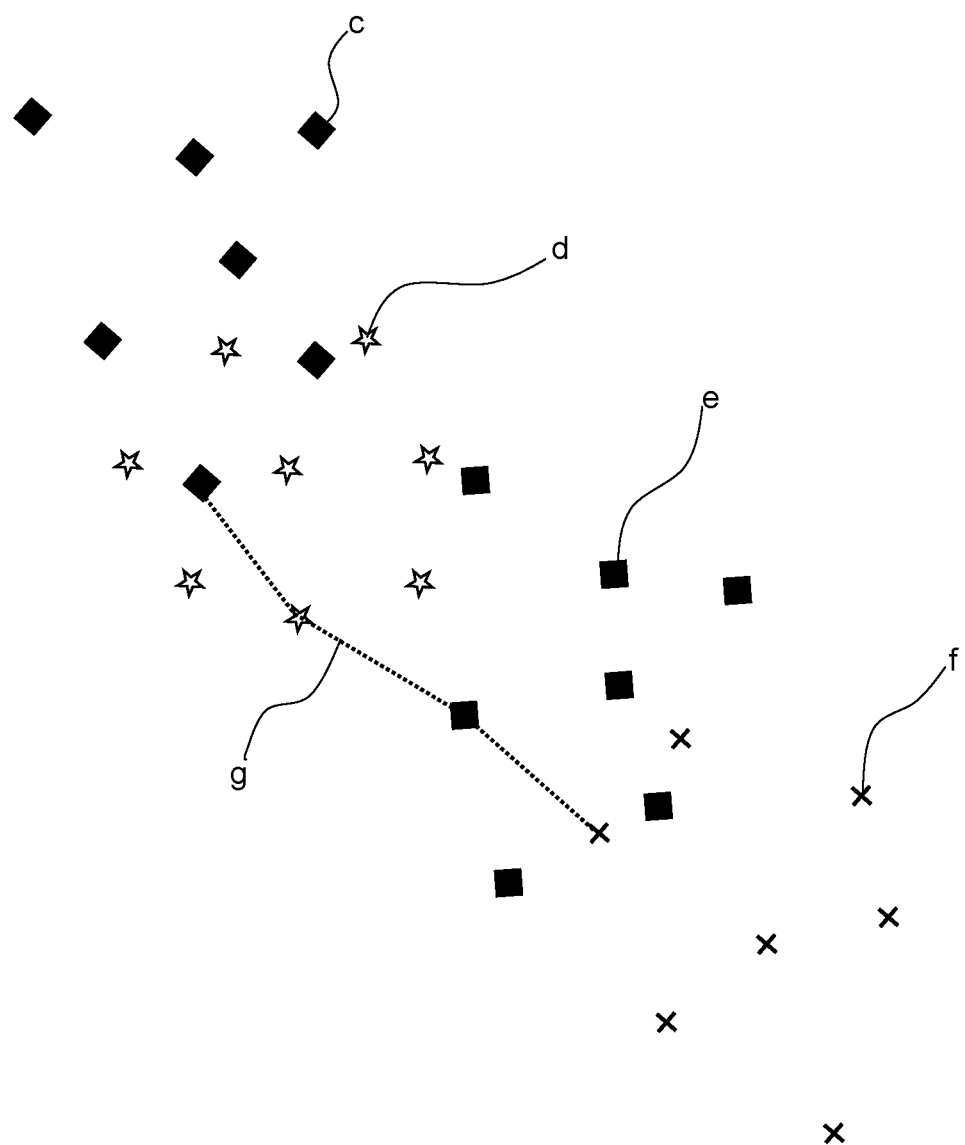

(51) Int. Cl.
*G01S 5/02* (2010.01)
*A01K 29/00* (2006.01)
*A01K 11/00* (2006.01)
G01S 1/04 (2006.01)
G08B 21/02 (2006.01)

(52) U.S. Cl.
CPC ............. *G01S 5/0278* (2013.01); *G01S 1/045* (2013.01); *G01S 2201/01* (2019.08); *G08B 21/0272* (2013.01)

(58) Field of Classification Search
USPC ................. 342/398, 450, 385; 340/539.13
See application file for complete search history.

(56) References Cited

U.S. PATENT DOCUMENTS

| | | | |
|---|---|---|---|
| 6,122,960 A | | 9/2000 | Hutchings et al. |
| 7,592,909 B2* | | 9/2009 | Zaruba ................... A61B 5/053 340/539.13 |
| 7,616,124 B2 | | 11/2009 | Paessel et al. |
| 7,821,406 B2* | | 10/2010 | Wangrud ............. A01K 11/008 340/573.1 |
| 7,904,097 B2* | | 3/2011 | Misikangas ........... H04W 64/00 455/403 |
| 8,055,469 B2* | | 11/2011 | Kulach ............... G06K 9/00536 702/141 |
| 8,706,137 B2* | | 4/2014 | Sridhara ............... H04W 4/029 455/456.1 |
| 9,026,363 B2* | | 5/2015 | Iketani ................. G01C 21/165 701/518 |
| 9,980,467 B2* | | 5/2018 | Auer ..................... A01K 11/006 |
| 10,502,576 B2* | | 12/2019 | Trigoni ................ G01C 22/006 |
| 2009/0211538 A1* | | 8/2009 | Corke .................. A01K 29/005 119/720 |
| 2010/0019924 A1* | | 1/2010 | D'Alessandro ....... G01S 5/0289 340/8.1 |
| 2010/0130230 A1* | | 5/2010 | Aggarwal ............. G01S 5/0263 455/456.1 |
| 2011/0102154 A1* | | 5/2011 | Hindhede ............ A01K 29/005 340/10.1 |
| 2013/0035110 A1 | | 2/2013 | Sridhara et al. |
| 2016/0345543 A1* | | 12/2016 | Auer ..................... A01K 29/005 |
| 2019/0373857 A1* | | 12/2019 | Leigh-Lancaster ......................... A01K 15/029 |
| 2020/0154680 A1* | | 5/2020 | Auer ......................... G01S 5/04 |

FOREIGN PATENT DOCUMENTS

| | | |
|---|---|---|
| EP | 0549081 | 6/1993 |
| EP | 1109031 | 6/2001 |
| EP | 1494397 | 1/2005 |
| EP | 2615598 | 7/2013 |
| GB | 2234070 | 1/1991 |
| GB | 2278198 | 11/1994 |
| WO | 9941723 | 8/1999 |
| WO | 02091001 | 11/2002 |
| WO | 03055388 | 7/2003 |
| WO | 2006077589 | 7/2006 |
| WO | 2010108496 | 9/2010 |
| WO | 2010109313 | 9/2010 |
| WO | 2011153571 | 12/2011 |
| WO | 2012079107 | 6/2012 |
| WO | 2012167301 | 12/2012 |

OTHER PUBLICATIONS

Austrian Search Report for Austrian Application No. AT A 374/2015, Completed by the Austrian Patent Office on Dec. 23, 2015, 1 Page.

* cited by examiner

METHOD FOR LOCATING ANIMALS USING RADIO WAVES

CROSS-REFERENCE TO RELATED APPLICATION

This application is the U.S. national phase of PCT Application No. PCT/AT2016/000064 filed on Jun. 9, 2016, which claims priority to AT Patent Application No. A 374/2015 filed on Jun. 12, 2015, the disclosures of which are incorporated in their entirety by reference herein.

The invention relates to a method for locating animals with the aid of radio waves.

Conventional systems for locating objects, for example animals, with the aid of radio waves have a plurality of radio transmitters and/or radio receivers, which are situated at known positions, and a respective radio transmitter and/or radio receiver on each object to be located.

Furthermore, the transmitters and receivers which are used for the locating by means of radio waves are referred to simply as "nodes". According to a method which is frequently used, in order to determine the position of the node fitted to the animal to be located, radio signals are used in the first step to measure the length by which the distances between the individual nodes of known position and the node to be located differ from one another. For example, a signal is simultaneously emitted from the node to be located to all other nodes for this purpose. The receiving nodes measure the time at which this signal arrives at them. The differences between the individual measured times, each multiplied by the speed of light (signal propagation speed in the relevant medium), produce the differences in the distances between the individual nodes and the transmitting node. For the further calculation, it is assumed in the first step that the node to be located is on a hyperboloid, the axis of which runs through two nodes of known position as focal points, the measured difference in the distance between these nodes and the node to be located being equal to that length by which—by definition—the distances between the two focal points and each point on the hyperboloid differ. The possible position of the device to be located is restricted to two points by intersecting at least three such hyperboloids. The further restriction to one point can be carried out with the aid of a fourth hyperboloid (with the result that at least four nodes of known position are therefore required) or by virtue of one point being able to be excluded in any case on the basis of known geometrical conditions, for example because it is outside the barn inside which animals can move. (In this text, "hyperboloid" is used to mean a rotationally symmetrical shell-like surface which can be imagined as being produced by rotating a hyperbola about its main axis.)

If, in a modification of the method described, the distances between the node on the animal to be located and the individual nodes of known position are directly inferred in the first step by means of radio waves, spherical shells can be assumed instead of the hyperboloid shells in the second step.

The documents AT 506628 A1, U.S. Pat. No. 6,122,960 A, DE 100 45 469 C2, WO9941723 A1, WO2011153571 A2 and WO2012079107 A2, for example, deal with radio localization of animals according to the principle explained.

On account of considerable measurement errors and measurement inaccuracies which often occur unavoidably in practice—for example on account of reflections of radio waves, further logical assumptions need to be introduced and corresponding evaluations need to be carried out in order to be able to obtain a location result which is reliable to some extent. In addition to the already mentioned exclusion of results which are impossible on account of geometrical conditions, stochastic methods are used, in particular, to also restrict the ambiguity of the respectively current result(s) on the basis of the results of preceding measurements and to find that measurement result which reflects the reality with the lowest error probability. A tried and tested stochastic model in this context is the hidden Markov model and, in particular, the Viterbi algorithm, with the aid of which the currently most probable sequence of states can be found in each case in a relatively efficient manner from a multiplicity of possible sequences of states.

A boundary condition which is usually used to calculate the residence probability is that, at least above a certain limit distance between a location currently being tested and the last assumed whereabouts, the probability of the location currently being tested being the current whereabouts falls with increasing distance. Expressed in a somewhat simplified manner, this means that the current whereabouts of an animal can be only within a circle with a particular limited radius around the last previously assumed whereabouts with a high degree of probability.

For example, EP 1 494 397 A2 describes a radio localization method, in particular for use in buildings. Radio localization is particularly difficult in buildings on account of signal reflections which frequently occur.

The documents EP 549081 A1, GB 2234070 A, GB 2278198 A, U.S. Pat. Nos. 3,999,611 A, 6,122,960 A, 7,616,124 B2, WO 2002091001 A1, WO 2003055388 A2, WO 2006077589 A2, WO 2010108496 A1 and WO 2010109313 A1, for example, propose and explain the practice of fitting acceleration sensors (inter alia) to live animals and inferring the behavior of the animals, which leads to the respective accelerations, from the measurement results from the acceleration sensors. For this purpose, the measurement results are usually transmitted, via a radio connection, to a data processing system and are checked by the latter for correspondences with temporal profiles of acceleration data stored as patterns.

In this case, the temporal profiles stored as patterns are characteristic of particular activities of the animal, for example walking, eating, ruminating, sleeping, possibly limping, or mounting other animals. In order to find the characteristic patterns, acceleration data were recorded in earlier work and the activities of animals determined on the basis of direct observation were recorded in a parallel manner and correlations between the acceleration patterns and activities were filtered out from the recorded data.

WO9941723 A1 deals with a device which is carried by a person or an animal, which device can transmit and receive radio waves and the position of which can be determined by means of a satellite navigation system. It is also mentioned that the device can also have an acceleration sensor in addition to various other sensors which can measure a biological condition, for example.

WO2011153571 A2 and WO2012079107 A2 deal with wireless ear tags for animals, an ear tag both enabling radio location and being able to contain an acceleration sensor, with the aid of which activities of the animal can be automatically identified by means of pattern evaluation.

U.S. Pat. No. 6,122,960 A deals predominantly with the measurement and recording of movements and distances covered by persons or animals by measuring accelerations and evaluating the measurements (integrating the measured acceleration vectors twice over time). It is proposed to additionally determine an "absolute position" by means of radio navigation.

On the basis of this prior art, the object of the invention is to provide an automatically running method for locating animals with the aid of radio waves, which method can also be used in exercise pens and enclosures for animals and provides more accurate and more reliable results in comparison with known methods of this type based on the investment cost required for this purpose.

In order to achieve the object, the known radio location method is taken as a basis, according to which stochastic calculations are used to filter out from the plurality of the respectively current position calculation results, on the basis of the results from previous measurements and calculations with regard to the possible position of the node to be located, that result which actually describes the current position with the highest degree of probability (that is to say with the smallest error probability), in which case the fact that, at least above a certain limit distance between the position defined by a current calculation result and the last assumed position of the node to be located, the probability of the position according to the current calculation result being the actual position of the node to be located falls with increasing distance between the two positions is concomitantly included as a boundary condition.

The invention proposes the practice of improving the method by also measuring acceleration data at the animal to be located and concomitantly including the measured acceleration data in the probability in such a manner that, if higher acceleration values are measured, the probability of a greater distance between two temporally successively assumed whereabouts is assumed to be increased to the disadvantage of the probability of a shorter distance between two temporally successively assumed whereabouts.

The invention is illustrated with the aid of a drawing for an advantageous exemplary method variant according to the invention:

FIG. 1: illustrates, in a highly stylized manner, the task of finding that sequence of whereabouts from many calculated whereabouts which corresponds to the reality with the highest degree of probability.

Figure 2:
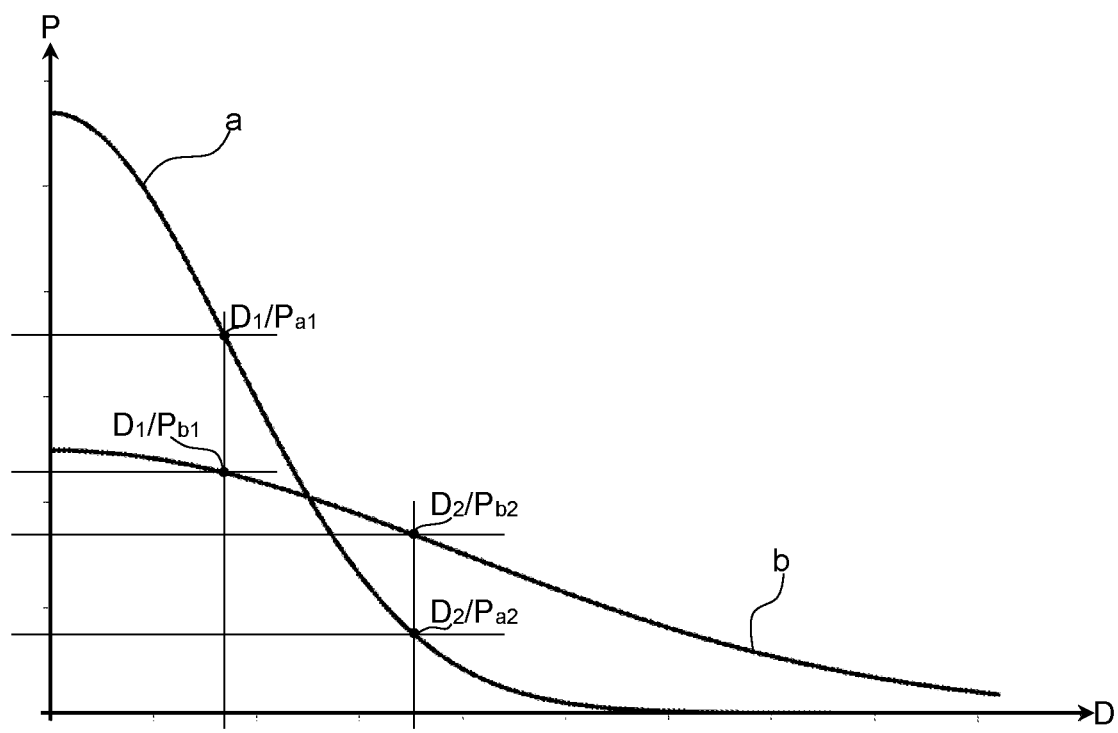

FIG. 2: shows, in a Cartesian coordinate representation, two assumed probability characteristics a, b for the magnitude of distances between possible positions (whereabouts) of the node to be located which are found in a temporally successive manner by means of measurement and calculation.

Figure 3:
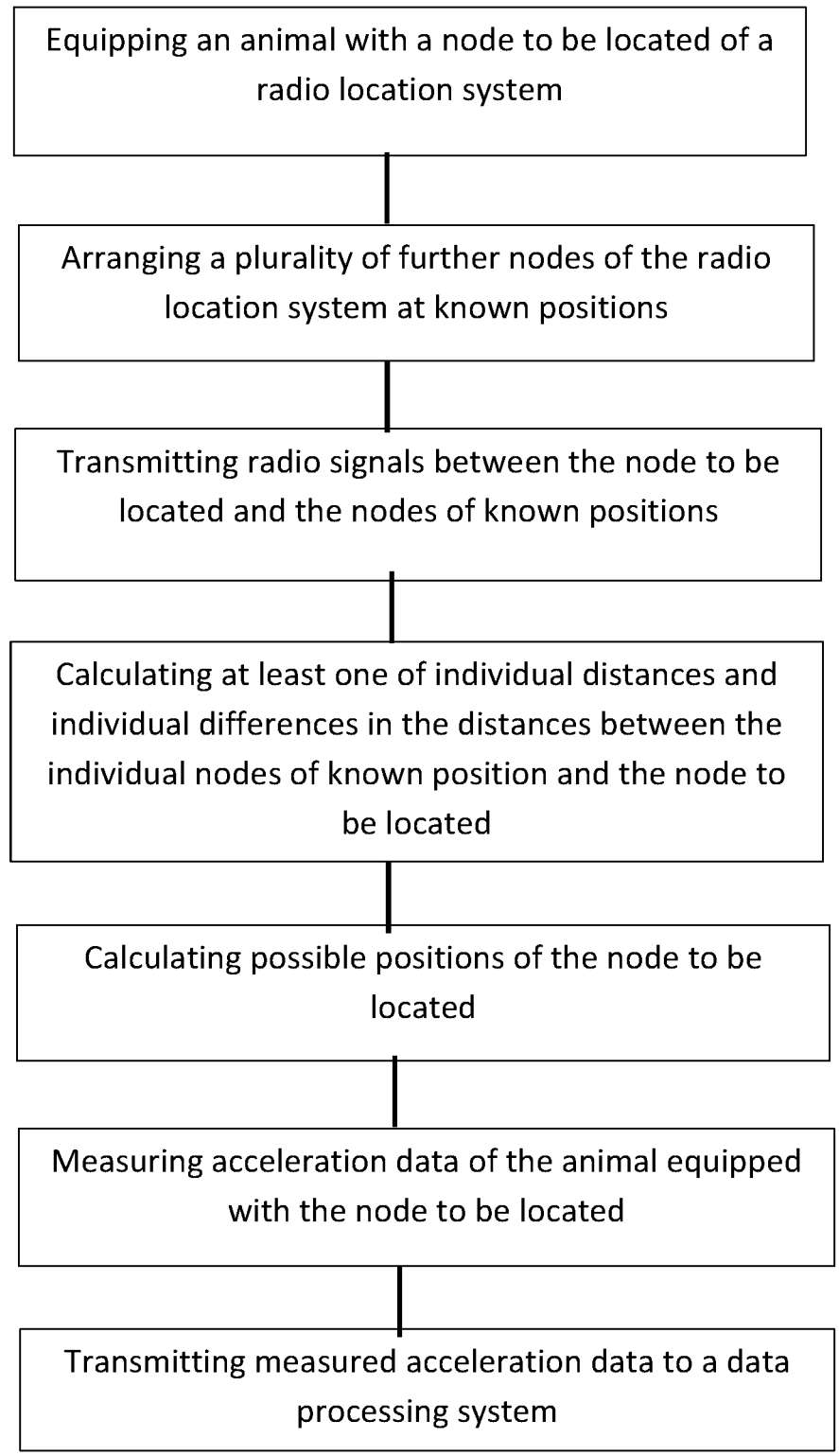

FIG. 3: shows an exemplary method for locating an animal with the aid of radio waves.

A radio location system for determining the whereabouts and the movements of an animal has—as explained in more detail further above—a plurality of nodes, the animal which can move freely wearing the node to be located and a plurality of further nodes being mounted in an immovable manner and their relative position with respect to one another being known. A measurement and calculation sequence for the radio location is carried out at controlled intervals of time. As described further above, the measurement is either a measurement of the distance between the node to be located and the nodes of known position or the measurement of the differences in the distances between the node to be located and the individual nodes of known position. The possible position of the node to be located (relative to the nodes of known position) is inferred from the measurement results by means of geometrical calculation. On account of the fact that more than four nodes of known position are very often present and radio signals are normally transmitted between two nodes not only in a direct straight line but also via further longer paths on account of reflection, a multiplicity of measurement results arise which can be mathematically referred to as an overdetermined system which is contradictory per se. Specifically, this means that whenever the respective last four reception results of radio signals between the node to be located and another node of known position in each case are used to calculate the position of the node to be located, a multiplicity of calculation results each describing a position in space are obtained, but only a small part of these calculation results actually describes the positions of the node to be located. In contrast, the majority of the calculation results is incorrect.

This relationship is symbolized in FIG. 1. A plurality of calculation results each signifying a position c (respectively symbolized by an oblique square) are followed by a plurality of calculation results each signifying a position d (respectively symbolized by a star) and so on via calculation results for positions e and positions f.

From the outset, it can be assumed as fixed that a single one of the positions c is followed by a single one of the positions d and then a single one of the positions e and finally a single one of the positions f on the actual path of the node to be located. A single path g is symbolized, by way of example, by means of a dotted line in FIG. 1 as representative of the myriad of paths which are thus possible in principle.

In order to calculate which path actually most probably reflects the reality, it is taken into account that the possible distances between two positions which immediately follow one another in terms of time (c and d, d and e, e and f) are not all equally probable, but rather that some classes of distances are more probable and others are less probable. Extremely large distances are impossible, for example, because they would mean that the animal wearing the node to be located were moving faster than permitted by the limits of biology and technology.

FIG. 2 shows a graph containing statements with regard to the probability of magnitudes of distances between two positions which are directly after one another in terms of time.

The two curves a, b each describe how very probable a distance D1, D2 between two temporally successive positions is.

If, for example, curve a applies and precisely two possible distances D1 and D2 are calculated for a time, the size ratio of the ordinate measures Pa1 and Pa2 assigned to the respective distances D1 and D2 shows the ratio of the probability which applies to D1 to the probability which applies to D2. For the further calculation, the absolute magnitude of the probabilities must also be normalized such that the sum of the probabilities across all possible positions always produces the same value (at best 1).

Both curves a and b have the maximum at D=0, as a result of which, according to both curves, distances between temporally successive positions are all the more probable, the shorter the distances.

However, curve a falls in a considerably steeper manner than curve b. This means that, when curve a is used to assume the probability, the probability of the greater distance D2 being the correct distance as opposed to the probability of the shorter distance D1 being the correct distance is very much lower than if curve b is used to assume the probability.

The invention provides for the selection of whether curve a or b is used to be dependent on the accelerations measured at the acceleration sensor carried by the animal. If small acceleration values have been measured during the period for which the position is to be calculated, the steeper curve a is used, and curve b is used if larger acceleration values have been measured.

The curves a, b can be assumed to be a normal Gaussian distribution, for example, in which case the assumed standard deviation which is known to be concomitantly included in the calculation formula for the curves can be assumed to be dependent on the measured acceleration. The dependency function should preferably be such that, with increasing acceleration, the standard deviation concomitantly increases monotonously, for example concomitantly increases in a manner directly proportional to the measured acceleration.

Optimal curve profiles and dependencies, such as the shape of the curves which are dependent on the measured accelerations, must be empirically determined. For this purpose, movement sequences of animals—or robots etc.—are logged, on the one hand, by means of direct observation, path measurement and recording and, on the other hand, are determined as described by means of radio location, acceleration measurements and a consolidating calculation. The consolidating calculation is varied using different underlying calculation parameters (for example different dependencies of the standard deviations of curves according to FIG. 1 on the measured acceleration) until the two determination methods optimally provide equally good results.

If all calculation parameters have been correctly assumed and are concomitantly included in the calculation, the best one of the possible paths g according to FIG. 1 can be found by forming the respective products of the three probabilities in each case which are assigned to the respective distances c-d, d-e and e-f according to FIG. 1 of all possible paths along positions sequences c-d-e-f and then selecting that path for which this product is the highest. (In order to keep the computing complexity in well tolerable limits, the known hidden Markov model methods, in particular the Viterbi algorithm, mentioned at the outset should be used.)

The acceleration value included in the calculation of the probabilities should be strictly speaking understood as meaning a mathematically processed numerical value which is formed from the plurality of acceleration values measured in the respectively current period of time and represents this plurality of values well. It may be a statistical mean value, for example the root mean square value, or the geometrical sum of the root mean square values measured in individual directions or the arithmetic mean value or the mean value of the individual absolute values, etc., but may also be a weighted mixture of different mean values of this type or the magnitude of a vectorial sum of the individual acceleration vectors determined. In practice, the relevant determination method is again best determined empirically. The selection is dependent not only on the theoretical mathematical precision but also, for example, on the measurement frequency, the measurement accuracy, the available computing capacity etc.

As the result of monitoring the movements of an animal, it is of interest, in particular, how much distance has been covered by the animal in a period of time (for example in one day) because this says a lot about the degree of activity of the animal and therefore the condition of the animal. In contrast, the knowledge of the exact positions occupied by the animal at the individual times is less meaningful and is therefore also of less interest.

In particular, when the monitoring of the entire distance covered by an animal in a "longer period of time" (for example one hour or one day) is involved, radio location errors have a very strong effect in relative terms if the animal does not move very much and small accelerations are therefore also measured.

Therefore, according to one preferred further development of the method according to the invention, it is advisable to concomitantly include, in the calculation of the most probable trajectory covered by a node of a radio location system fastened to an animal, the fact that results from the radio location system—that is to say the information relating to the distance between the node to be located and nodes of known position or relating to the distance between temporally successive positions of the node to be located obtained by means of radio signal transmission—which were obtained while high acceleration values were measured are correct with a higher degree of probability than results from the radio location system which were obtained while low acceleration values were measured.

There are a multiplicity of possible ways of including this in the specific calculation of the trajectory which can be considered to be the most probable. As an extremely simple exemplary method, it is possible to simply ignore measurement results of the radio location which apply to time ranges in which the magnitude of the measured acceleration was below a particular minimum limit. The ultimately assumed trajectory then runs on the path which is as direct as possible only between those possible result positions of the radio location which apply to times at which accelerations above said minimum value were measured.

The invention claimed is:

1. A method for locating an animal with the aid of radio waves, comprising:
   equipping an animal with a node to be located of a radio location system;
   arranging a plurality of further nodes of the radio location system at known positions;
   transmitting radio signals between the node to be located and the nodes of known positions;
   calculating at least one of individual distances and individual differences in the distances between the individual nodes of known position and the node to be located using parameters measured during radio signal transmission;
   calculating possible positions of the node to be located from a plurality of calculation results by a data processing system, wherein a hidden Markov model is used to select from the plurality of respectively current position calculation results, on the basis of the results from previous measurements and calculations with regard to the possible position of the node to be located, that result describing the current position with a maximum degree of probability, wherein that at least from a certain limiting distance between the node position defined by a current calculation result and a latest assumed position of the node to be located, upon increasing distance between the two positions, the probability decreases that the latest assumed position according to the current calculation result is the actual position of the node to be located;
   measuring acceleration data of the animal equipped with the node to be located; and
   transmitting the measured acceleration data to the data processing system,
   wherein
      an assumption of said probability depends on the measured acceleration data, and further wherein, for greater measured acceleration values, the probability of a greater distance between two temporally successively assumed positions is assumed to be increased to the detriment of the probability of a shorter distance between two temporally successively assumed positions.

2. The method as claimed in claim 1, wherein a probability of the magnitude of a distance between two temporally successive positions of the node to be located is assumed to at least approximately follow a normal Gaussian distribution on the basis of the magnitude of the distance, a standard deviation being assumed to increase monotonously with the measured acceleration.

3. The method as claimed in claim 2, wherein a statistical mean value of temporally successive measured values of accelerations is used as the acceleration value which is included in the assumption of the probability.

4. The method as claimed in claim 3, wherein, when calculating a most probable sequence of a number of positions assumed by the node to be located, distance information relating to the node to be located which is measured from the radio signal transmission is concomitantly included in the calculation as correct with a greater degree of probability if higher acceleration values are determined during the acceleration measurement than if lower acceleration values are determined during the acceleration measurement.

5. The method as claimed in claim 2, wherein, when calculating a most probable sequence of a number of positions assumed by the node to be located, distance information relating to the node to be located which is measured from the radio signal transmission is concomitantly included in the calculation as correct with a greater degree of probability if higher acceleration values are determined during the acceleration measurement than if lower acceleration values are determined during the acceleration measurement.

6. The method as claimed in claim 1, wherein a statistical mean value of temporally successive measured values of accelerations is used as an acceleration value which is included in the assumption of the probability.

7. The method as claimed in claim 6, wherein, when calculating a most probable sequence of a number of positions assumed by the node to be located, distance information relating to the node to be located which is measured from the radio signal transmission is concomitantly included in the calculation as correct with a greater degree of probability if higher acceleration values are determined during the acceleration measurement than if lower acceleration values are determined during the acceleration measurement.

8. The method as claimed in claim 1, wherein, when calculating a most probable sequence of a number of positions assumed by the node to be located, distance information relating to the node to be located which is measured from the radio signal transmission is concomitantly included in the calculation as correct with a greater degree of probability if higher acceleration values are determined during the acceleration measurement than if lower acceleration values are determined during the acceleration measurement.

* * * * *